United States Patent
Brucker et al.

(10) Patent No.: US 11,808,643 B2
(45) Date of Patent: Nov. 7, 2023

(54) THERMAL CONDUCTIVITY PRESSURE GAUGE WITH HEATED CHAMBER WALL

(71) Applicant: MKS Instruments, Inc., Andover, MA (US)

(72) Inventors: Gerardo A. Brucker, Longmont, CO (US); Timothy C. Swinney, Fort Collins, CO (US)

(73) Assignee: MKS INSTRUMENTS, INC., Andover, MA (US)

( * ) Notice: Subject to any disclaimer, the term of this patent is extended or adjusted under 35 U.S.C. 154(b) by 37 days.

(21) Appl. No.: 17/453,450

(22) Filed: Nov. 3, 2021

(65) Prior Publication Data

US 2022/0155172 A1    May 19, 2022

Related U.S. Application Data

(60) Provisional application No. 63/114,287, filed on Nov. 16, 2020.

(51) Int. Cl.
| | | |
|---|---|---|
| *G01L 21/12* | (2006.01) | |
| *G01L 21/14* | (2006.01) | |
| *G01L 11/00* | (2006.01) | |

(52) U.S. Cl.
CPC ............ *G01L 21/12* (2013.01); *G01L 11/002* (2013.01); *G01L 21/14* (2013.01)

(58) Field of Classification Search
CPC ......... G01L 21/12; G01L 21/14; G01L 21/10; G01L 21/00; G01L 9/00; G01L 9/0002;
(Continued)

(56) References Cited

U.S. PATENT DOCUMENTS

| | | |
|---|---|---|
| 6,973,834 B1 | 12/2005 | Golan |
| 7,207,224 B2 | 4/2007 | Rutt et al. |

(Continued)

FOREIGN PATENT DOCUMENTS

| | | |
|---|---|---|
| EP | 3690417 A1 | 8/2020 |
| JP | H05 281073 A | 10/1993 |
| WO | 2019203929 A1 | 10/2019 |

OTHER PUBLICATIONS

MKS Instruments, Inc. Data Sheet, "E28E 0.1-1000 Torr Heated (100° C) Baratron® Ethernet Capacitance Manometer with Etch Sensor"; date unknown but likely prior to 2021, the date printed; 2 pages.

(Continued)

*Primary Examiner* — Andre J Allen
(74) *Attorney, Agent, or Firm* — HAMILTON, BROOK, SMITH & REYNOLDS, P.C.

(57) ABSTRACT

A Process Critical Thermal Conductivity Gauge (PCTCG) instrument relies on gauge chamber wall above-ambient-temperature-control (AATC) to provide improved accuracy and thermal stability with reduced and linearized temperature coefficients. A sensor resistor is exposed to gas pressure in a gauge chamber. AATC is provided by control of a heater that heats a chamber wall to control temperature difference between the sensor resistor and chamber wall. An example application of this technology is to end-point detection in lyophilization where the TCG is used to track partial pressures of water in binary gas mixtures.

34 Claims, 6 Drawing Sheets

(58) Field of Classification Search
CPC ......... G01L 9/025; G01L 21/32; G01L 21/30;
G01L 21/34; G01L 11/002; G01L 19/00;
G01L 19/04; G01L 19/143; G01L 1/14;
G01L 1/2206; G01L 19/0084; G01L
19/147; G01L 21/22; G01L 9/0022; G01L
15/00; G01L 19/083; G01L 19/086; G01L
19/14; G01L 2019/0053; G01L 21/02;
G01N 1/10; G01N 25/18; G01N 33/0032;
G01N 33/15; G01N 27/18; G01N
30/6095; G01N 30/66; G01N 33/497;
G01N 1/42; G01N 33/60; G01N 1/2294;
G01N 1/405; G01N 2001/1062; G01N
2001/2267; G01N 27/127; G01N 30/461;
G01N 30/466; G01N 30/468; G01N 7/10;
G01N 15/06; G01N 19/04; G01N 21/33;
G01N 2203/0044; G01N 2203/0091;
G01N 2203/04; G01N 3/56; G01N 30/16;
G01N 30/62; G01N 7/02; G01N 9/00
See application file for complete search history.

(56) References Cited

U.S. PATENT DOCUMENTS

| | | |
|---|---|---|
| 7,613,586 B2 | 11/2009 | Higashi |
| 8,171,801 B2 | 5/2012 | Le Noc et al. |
| 8,893,554 B2 | 11/2014 | Stambaugh |
| 9,970,838 B2 | 5/2018 | Minami |
| 10,753,816 B2 | 8/2020 | Kornelsen et al. |
| 10,845,263 B2 | 11/2020 | Brucker et al. |
| 2007/0186658 A1 | 8/2007 | Borenstein |
| 2014/0026640 A1 | 1/2014 | Plochinger |
| 2018/0306763 A1 | 10/2018 | Brucker et al. |
| 2019/0316981 A1 | 10/2019 | Brucker et al. |
| 2019/0346328 A1* | 11/2019 | Brucker ............. G01N 33/0032 |
| 2021/0208016 A1* | 7/2021 | Brucker .................... G01L 9/00 |
| 2022/0082466 A1* | 3/2022 | Huang .................... G01L 21/12 |
| 2022/0364942 A1* | 11/2022 | Yoshikawa ......... G01L 19/0092 |

OTHER PUBLICATIONS

MKS Instruments, Inc. Data Sheet, "727A 1-1000 Torr, Heated (45° C) General Purpose Absolute Baratron® Capacitance Manometers"; date unknown but likely prior to 2021, the date printed; 4 pages.

VACOM Vakuum Komponenten & Messtechnik GmbH Data Sheet, "Heat Loss Vacuum Gauges", date unknown but likely prior to 2020, the date printed; 1 page.

Notification of Transmittal of the International Search Report and the Written Opinion of the International Searching Authority, or the Declaration for International Application No. PCT/US2021/072211 dated Feb. 8, 2022.

275 Convectron® Pirani sensor, an MKS product since 1972, 1 page.

Novel Baffle Design for Demanding Applications, by Caspar Ask Christiansen, MKS Granville-Phillips Division (DK), 1 page, Abstract presented at AVS 62nd International Symposium & Exhibition, Oct. 19, 2015; Particulate baffle designed for MEMS Pirani Gauge.

Series 275 "Convectron® Vacuum Gauges Instruction Manual" by Granville-Phillips, Helix Technology Corporation, 79 pages, Oct. 1999. See "screen" at the bottom of p. 3-5 and top of p. 3-6.

* cited by examiner

THERMAL CONDUCTIVITY PRESSURE GAUGE WITH HEATED CHAMBER WALL

RELATED APPLICATION

This application claims the benefit of U.S. Provisional Application No. 63/114,287, filed on Nov. 16, 2020. The entire teachings of the above application are incorporated herein by reference.

BACKGROUND

Thermal conductivity gauges (TCGs) measure pressure based on the relationship between temperature of a heated sensor resistor and the amount of heating power applied to the sensor resistor. For example, the amount of heating power required to maintain a thin wire (a sensor resistor) at a constant temperature, $T_s$, may be monitored. As the pressure of gas increases, the gas has increased thermal conductivity and takes additional heat away from the heated wire, and the heating power required to keep the wire at constant temperature increases. A calibration curve correlating heating power to pressure allows pressure measurements. Calibrations are typically performed at the factory against pure Nitrogen gas. This is an indirect pressure measurement where heating power is proportional to the gas pressure.

This principle is used in the well-known Pirani gauge, in which heat loss is measured with a Wheatstone bridge network that serves both to heat the sensing element and to measure its resistance. In a Pirani gauge, a temperature-sensitive resistance is connected as one arm of a Wheatstone bridge. The temperature-sensitive resistance is mounted in a chamber exposed to the vacuum environment whose pressure is to be measured.

A conventional Pirani gauge is calibrated against several known pressures to determine a relationship between pressure of a gas and the power loss to the gas or the bridge voltage. Then, assuming end losses and radiation losses remain constant, the unknown pressure of a gas may be directly determined by the power lost to the gas or related to the bridge voltage at bridge balance. Pirani gauges with Wheatstone bridges and alternative TCG circuits are presented in US 2007/0186658 and US 2019/0316981A1.

A problem addressed by many TCGs is that the actual heating power depends not just on the temperature of the sensor wire, $T_s$, but on the difference in temperature between the chamber wall ($T_w$) and the sensor wire, that is, the calibration curve is dependent on the wall temperature that is also dependent on ambient temperature. As the temperature $T_w$ of the chamber wall increases, the amount of power required to heat the filament decreases and that is interpreted as a drop in pressure unless ambient temperature compensation is implemented. Ambient temperature severely impacts accuracy. Standard TCG designs either measure wall temperature and compensate against ambient temperature changes while the sensor wire remains at constant temperature, requiring complicated algorithms/calibration procedures, or adjust the temperature of the sensor wire to keep a constant temperature difference between the sensor wire and the wall, requiring additional and expensive compensation wire schemes built into the gauge. Such schemes are required even if room temperatures are stable, as TCGs tend to self-heat as pressure increases, changing $T_w$.

SUMMARY

TCGs are finding increased use in process critical applications that need data provided by a TCG to make mission critical decisions, and gauge users are starting to demand improved performance that is not available in current commercial products, including improved accuracy, repeatability and temperature stability. A Process Critical Thermal Conductivity Gauge (PCTCG) is, for example, needed to match the requirements of modern lyophilization processes.

One of the biggest factors affecting accuracy of TCGs is the temperature coefficient of the pressure readings. Most commercial products specify accuracies and temperature ranges over which they operate. However, commercial products are not capable of meeting the accuracy requirements over entire temperature ranges of operation; it is standard to see the accuracy specification for operation at a single or narrow temperature range. Some of the more modern products made good progress towards the proper compensation of pressure readings against ambient temperature variations by performing gauge specific temperature compensation calibrations at the factory. The compensation calibration measurements are time consuming and rely on temperature boxes that are prone to failure and high maintenance costs, and even with such measures, accuracies are only specified at a single temperature, not expected to be met over the entire temperature range. Even in the absence of large temperature variation in room temperature, TCGs are also affected by pressure dependent self-heating, so that temperature compensation is still needed even under stable room temperatures.

There is a need in the vacuum industry for TCGs that improve upon the accuracy, reproducibility and repeatability of pressure measurements while minimizing the effect of ambient temperature variations on pressure readings.

The solution presented is based on precise temperature control of the sensor's chamber wall above ambient temperature. When both sensor wire and wall temperatures are properly stabilized, influence of room temperature on pressure readings is reduced. Optimization of the sensor and wall temperatures against process conditions may also be obtained.

A thermal conductivity pressure gauge comprises a sensor resistor and a sensor chamber having a chamber wall spaced from the sensor resistor. A heater heats the chamber wall. Electronics apply power to the sensor resistor and determine pressure of gas in the sensor chamber based on the relationship between resistance of the sensor resistor and applied power. The electronics also apply power to the heater to heat the chamber wall to control temperature difference between the sensor resistor and the chamber wall.

In a method of thermal conductivity pressure measurement, a sensor resistor is provided within a chamber having a chamber wall spaced from sensor resistor. The chamber wall is heated to control temperature difference between the sensor resistor and the chamber wall. Power is applied to the sensor resistor and pressure of gas in the chamber is determined based on the relationship between resistance of the sensor resistor and applied power.

Power applied to the sensor resistor may maintain a constant temperature $T_S$, and power applied to the heater may maintain a constant chamber wall temperature $T_w$. The temperature $T_S$ may be greater than $T_W$. The power applied to the sensor resistor to maintain constant temperature may determine the pressure in the chamber. Alternatively, applied power to the sensor resistor may be held constant, and the sensed temperature determines the pressure.

The temperature $T_S$ may be controllable to different constant temperatures. Similarly, the wall temperature $T_w$ may be controllable to different constant temperatures.

The heater may be positioned within insulation surrounding the chamber wall. The heater may be a ribbon heater adhered to an inside surface of insulation surrounding the chamber.

The heater may be coupled to electronics that apply power to the heater, and the chamber wall and sensor resistor may be inserted into the heater to plug sensor leads into the electronics, making electrical connection between the sensor resistor and the electronics.

The chamber wall temperature may be in the range of 45° C.-110° C. The sensor resistor temperature may be greater than the chamber wall temperature by an amount within the range of 30° C.-110° C. (In a Pirani type sensor, the sensor wire is always hotter than the wall, and the upper 110 C limit in the wall was chosen to be above the boiling point of water.)

The sensor resistor may be a thin sensor wire as in a conventional Pirani gauge. Alternatively, the sensor resistor may be on a surface of a cavity, with the chamber wall being an opposite wall of the cavity.

The electronics may be configured to heat the heater to a temperature that cleans the heater wall. Having heating power available allows us to: control temperature of the chamber and absorb changes in ambient, dry the inside of the gauge after exposure to liquid droplets, prevent deposition and sticking of contamination inside the sensor, and outgas contaminants through bake-out.

A baffle may be provided across an opening in the chamber wall to a process chamber.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

Figure 1:
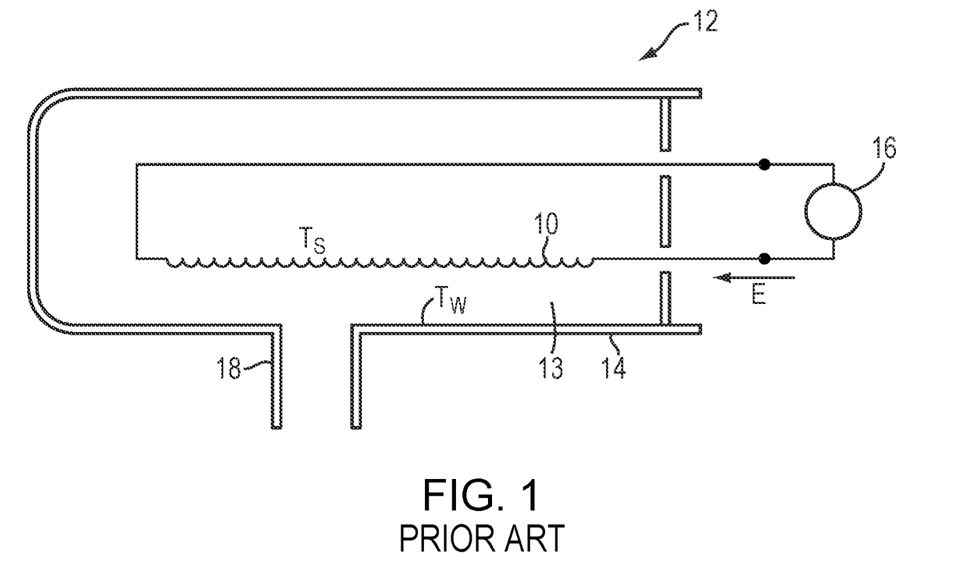
FIG. 1 is an illustration of a prior art thermal conductivity gauge.

FIG. 1 shows a TCG 12 having a sensor wire 10 within a sensor chamber 13 coupled through a pipe 18 to a process chamber, the pressure of which is to be measured. Wire 10 is heated by power E from source 16. The thermal power dissipated from the wire into the gas is proportional to the pressure and to the kind of gas (indirect measurement) so that $E \propto P_{gas}$. The heating power required to maintain the wire at a constant temperature increases proportionally to gas pressure. But the electrical heating power E required to maintain the sensor wire 10 of the TCG 12 at its fixed temperature $T_s$ is also related to the difference in temperature between the sensor wire ($T_s$) and the temperature ($T_w$) of the sensor chamber wall 14: $E \propto (T_s - T_w)$. This means that if $T_w$ increases, the heating power requirement E decreases, and that decrease can be misinterpreted as a drop in pressure unless the change in $T_w$ is accounted for as with temperature compensation calibration and algorithm. Since pressure is measured through the heating power measurement, any change in $T_w$ not properly accounted for by temperature compensation algorithms will cause an error in the pressure measurement and compromise the accuracy of the device. Since self-heating typically impacts $T_w$ at high pressures, it also can affect accuracy of the pressure readings.

Above Ambient Temperature Correction (AATC) of the wall temperature $T_w$ improves the accuracy of the pressure sensor. The outer chamber wall of the gauge may be temperature stabilized to a very narrow temperature range above ambient, preferably not to exceed 0.1° C. variability. The chamber wall temperature is kept above room temperature, for example, using a heating jacket, providing a constant temperature difference between the sensor wire and the chamber wall independent of pressure and ambient temperature. With tight temperature control of the temperature difference between the chamber wall and the wire, the temperature coefficients for pressure readings are much smaller, with closer to linear behavior, and additional compensation wires may no longer be necessary to achieve high accuracy pressure readings.

The implementation of above ambient temperature control (AATC) of the chamber walls allows a TCG to:

1. Provide more accurate pressure readings that are not dependent on room temperature. The instrument can meet accuracy specifications over a wider temperature range.
2. Provide more accurate pressure readings that are not impacted by self-heating.
3. Provide the ability to dry the gauge after exposure to wet chemistries by momentarily increasing the temperature of the wall.
4. Provide reduced deposition of precursor chemicals on the chamber of the gauge during process.
5. Provide the ability to decontaminate the gauge after exposure to sticky precursors by momentarily increasing the temperature of the chamber.
6. Provide the ability to bake out the gauge for UHV compatibility.
7. Provide improved zero-drift performance for pressure measurements at the bottom of the pressure range of operation with reduced need to perform routine re-zeroing of pressure reading output.

Figure 2:
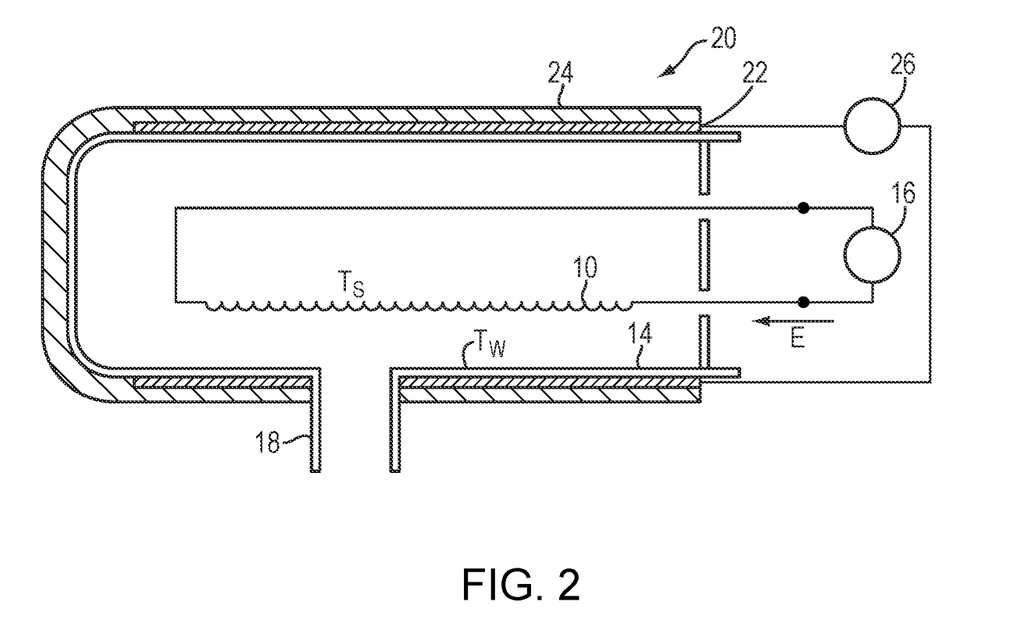
FIG. 2 is a cross-sectional view of a modification of the gauge of FIG. 1 in accordance with principles of the present invention.

One embodiment of the heating system to control the chamber temperature is illustrated in FIG. 2. Heating element 22 is wrapped around the chamber wall 14. The heating element 22 may be a resistive heater filament in a tape that may include an adhesive to adhere the tape to either the chamber or to a surrounding insulator 24. Power to the heater 22 is provided by an electrical source 26.

The preferred implementation is to maintain the wall temperature $T_w$ above ambient. With expected ambient temperature range of operation between 0° and 40° C., preferred temperature ranges of $T_w$ are between 45° and 110° C. A controlled 45° C. chamber temperature remains above ambient and should allow high accuracy pressure measurements over the entire temperature range. Temperatures higher than 110° C. are not recommended for the walls as then the sensor wire would need to run too hot and degrade due to contamination build up (i.e. through thermal decomposition of precursor chemicals). Most modern TCG gauges operate with their sensor wire at a fixed temperature 30° to 110° C. above ambient. Preferred embodiments use a fixed temperature of the sensor wire between 30° and 110° C. above wall temperature. The exact temperatures of the sensor and of the wall may be dialed to provide optimal sensitivity at the controlled process pressure.

Wall temperatures of 100° to 110° C. may be required to provide fast drying of the sensor internal surfaces, for example after lyophilization processes that result in water droplets reaching into the sensor. Highest wall temperatures can also be used to bake out and clean the internal wall surfaces between process runs.

Both sensor wire and chamber wall temperatures are variables accessible by the customer and can be changed throughout the process to adapt to changing gas and process conditions and to decontaminate the gauge and dry the gauge. Command or digital inputs allow the user to switch operational conditions. LEDs may indicate the status of the oven: normal, degas, dry, etc.

One of the emerging applications of TCGs is detection of endpoints in lyophilization. In this case, the total pressure, as measured with a capacitance diaphragm gauge, is fixed somewhere between 0.1 and 1 Torr. Throughout the entire drying process, gas composition in the binary gas mixture changes, but pressure is kept constant through introduction of a nitrogen purge through a gas mass flow controller connected to the capacitance diaphragm gauge. A TCG gauge used under this application does not need to provide full pressure range of operation, but rather should be optimized to provide the highest possible resolution in pressure measurement at and around the controlled process pressure. The lyophilization comparative pressure measurement (CPM) methodology uses the difference between the pressure measurement provided by the TCG and that of a capacitance manometer to provide partial pressure of water: $PPH_2O=[(P\ Pirani)-(P\ cdg)]/0.4$ in a mixture of pure nitrogen and water. See US 2018/0306763 and US 2019/0346328. The temperature conditions of the wire and wall may be optimized to provide highest resolution for this partial pressure measurement.

A process critical TCG should include flexibility to adjust both chamber wall and sensor wire temperatures to adapt to different applications or different stages of a single process. For example, wall temperatures may be increased to dry the TCG if water droplets access the sensor, or to eliminate deposition of certain precursors, or to clean a gauge between processes (bake out contaminants). Sensor temperature may also be tweaked based on the process pressure conditions. For example, for lyophilization at constant pressure, the gas pressure will be fixed somewhere between 0.1 and 1 Torr and the sensor wire temperature can be optimized to provide optimal sensitivity and resolution at those pressures.

Figure 3:
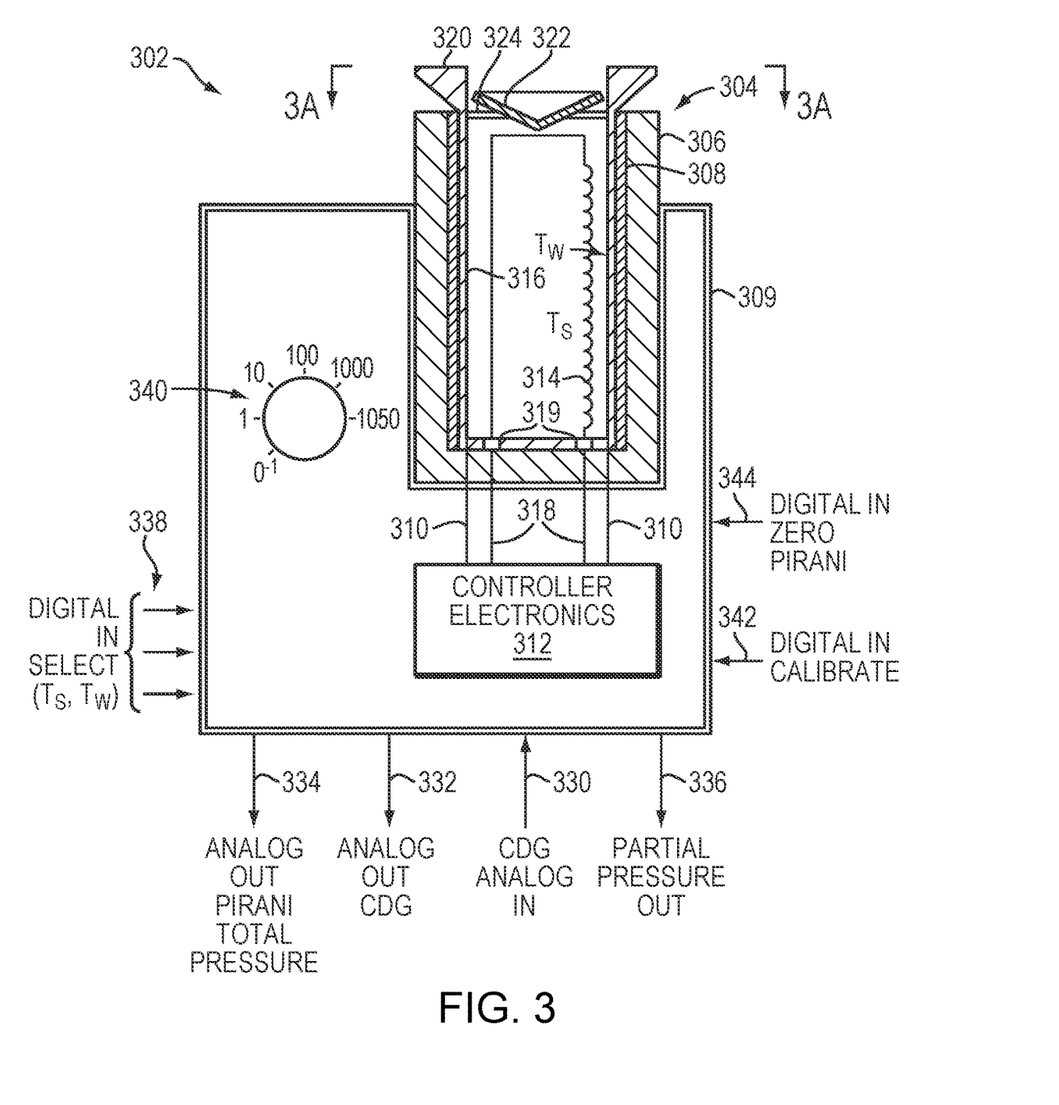
FIG. 3 is a cross-sectional view of an alternative embodiment of the invention associated with control electronics for providing both total pressure and partial pressure measurements.

Another embodiment of the TCG, packaged with controller electronics in a configuration particularly suited to a lyophilization application, is illustrated in FIG. 3. In the TCG system 302, controller electronics 312 are mounted in a module housing 309. The housing also supports a TCG sensor comprising a sensing wire 314 in chamber wall 316. The sensor is removable from the assembly for repair or replacement. A heater oven 304 for heating the chamber (envelope) wall 316 of the sensor is fixed within the housing 309 and positioned to receive the gauge wall 316. The oven 304 comprises an insulator 306 and a heating tape 308 fixed to the inner surface of the insulator 306. The heating tape is connected by leads 310 to the controller electronics, which maintain power to the heating tape to maintain a desired chamber wall temperature. The insulation protects the electronics from the high temperatures that the oven can reach. The heater may be part of the electronics module, or the heater may be part of the removable gauge. Putting the heater on the controller simplifies sensor design and reduces the replacement cost. Putting the heater on the sensor might provide a more accurate temperature control.

Leads 318 to the sensor wire 314 are joined to the base of the chamber wall 316 through electrical insulators 319. The leads 318 plug into the controller electronics for application of power to maintain the temperature of the sensing wire and to sense pressure within the chamber. The sensor assembly of the sensor wire 314 and wall 316 may be removed from the heater oven 304 by sliding the chamber axially, upwardly as viewed in FIG. 3, and unplugging the leads 318 from the controller electronics. With this configuration of the heating oven integral with the controller module and a pluggable sensor assembly, sensor replacement costs can be reduced because they do not involve costly heater replacement. The chamber may be coupled to a process chamber such as a lyophilization process chamber at flange 320.

When temperature compensation is an integral part of the electronics module the electronics may also be heated for additional temperature compensation. If the wall temperature is controlled between 45 and 70 C, it makes sense to include the temperature sensitive components of the electronics in the same oven to obtain temperature control for both the sensor (providing the signal) and the electronics (receiving and processing the signal). This is less likely if there is intention to heat above 70 C as then special high temperature electronics might be required. If electronics are included in the oven, not all the electronics in the module need to be included. Analog processing components would be the best candidates for temperature control.

Figure 3A:
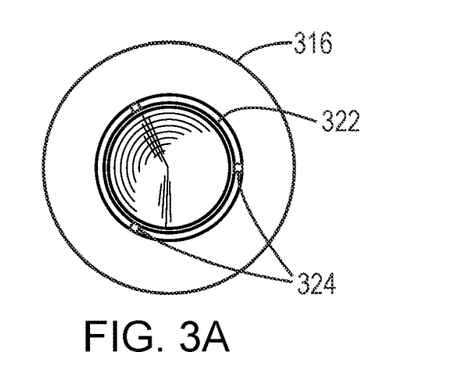
FIG. 3A is a top view of the sensor of FIG. 3.

A baffle 322 may be suspended across the end opening of the envelope 316 by struts 324 (FIG. 3A) to block contaminants and radiation. The contaminants may be gases, line of sight sputtered material, and even droplets. The baffle is thermally connected to the wall 316 at heated temperature to eliminate condensation and to provide thermal boundary conditions along the axis. In normal operation, the assembly is inverted relative to the orientation illustrated in FIG. 3 such that the baffle 322 faces downward into the process chamber. It has a conical shape in order to drain liquid away from the interior of the chamber and the sensor wire.

The gauge assembly 302 is configured to receive a gas independent pressure input from a capacitance diaphragm gauge. To that end, the system receives an analog input from the capacitance diaphragm gauge at input 330 and passes that pressure reading through to an analog output 332. The controller electronics 312 also determine a total pressure reading from the TCG which is gas dependent. As described above, the controller electronics combine the gas independent total pressure reading from the capacitance diaphragm gauge and the gas dependent total pressure reading from the TCG to compute a partial pressure of water and provide an analog output of that partial pressure at 336.

A series of digital inputs or digital commands 338 allow switching between preset ($T_w$, $T_s$) sets for different process steps. For example, one for measuring and one for drying. $T_w$ is the AATC wall temperature and may be variable between 45 and 110° C. The lower limit is higher than the 40° C. max temperature of operation, and the upper limit is above the boiling point of water. $T_s$ is the sensor wire temperature. $T_s-T_w$ would likely be between 30 and 110° C. There may be calibration information compatible with multiple $(T_w, T_s)$ pair combinations.

A dial 340 is adjusted to inform the instrument of the full range of the CDG. A digital command 338 can also be used.

Digital In Calibrate 342 forces the TCG to read the same as the CDG, close to the full range of the CDG, when pure Nitrogen is present as gas. This is used to make sure that both CDG and TCG are calibrated properly and that the partial pressure reading is zeroed when pure N2 is present in the system.

Digital In Zero 344 zeroes the Pirani and CDG readings when high vacuum pressure levels are achieved. There may be two different inputs, one for each sensor, but a combined input is provided in this example. When the pressure reaches high vacuum levels, both the CDG and the TCG can be rezeroed.

Digital In $(T_s, T_w)$ 338 selects a $(T_s, T_w)$ pair for operation. This could change during a process. Digital command is also available. Calibration tables of heating power vs. gas pressure readings should be available for multiple $(T_w, T_s)$ pairs.

LEDS may be available to indicate the status of the Oven. For example: Normal, Degas, Dry, etc.

Figure 4:
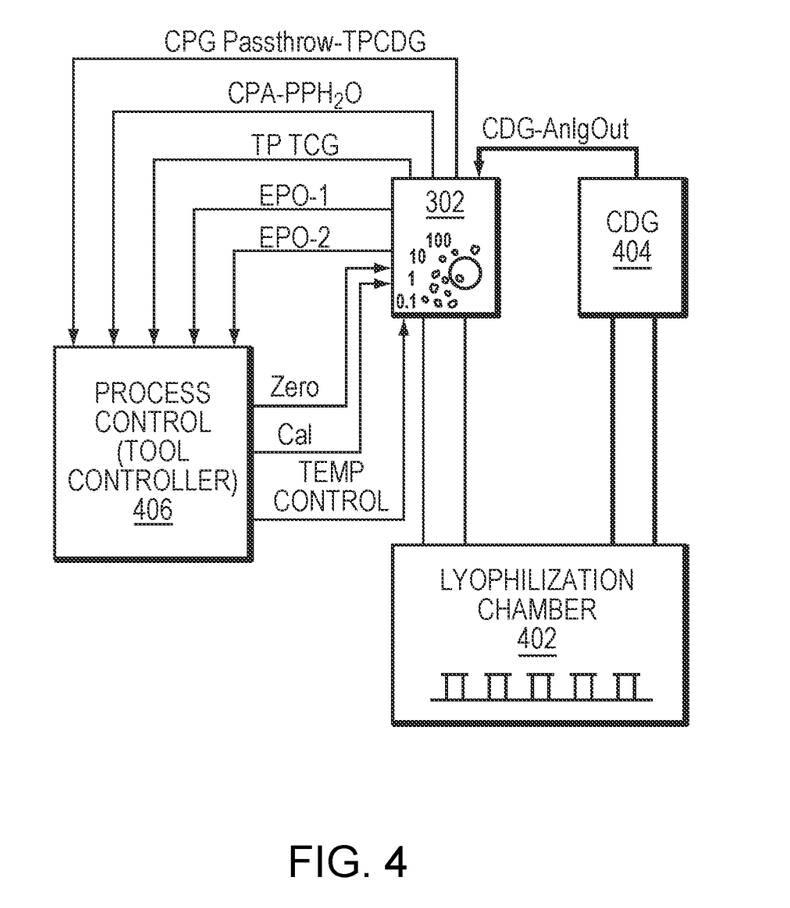
FIG. 4 is an illustration of the assembly of FIG. 3 in a lyophilization system.

FIG. 4 illustrates installation of the assembly 302 of FIG. 3 in a lyophilization process system. The gauge assembly 302 is inverted and coupled to the lyophilization chamber 402. A capacitance diaphragm gauge such as at 404 is typically already included in such a system. Also included is a process controller 406. The assembly 302 is coupled to that controller through the inputs and outputs described above to provide the total pressure reading from the CDG and to obtain and provide the partial pressure reading as discussed above.

The description provided has focused on traditional TCG designs including sensor wires, but the above ambient temperature control is also applicable to MEMS scale devices. MEMS sensors are sensitive to temperature changes partly due to residual stress often stored in the devices. Sometimes, even minimal temperature changes can cause sudden changes in performance due to mechanical stress mechanisms. Temperature stabilization of the small sensor is very practical and can greatly improve performance.

Figure 5:
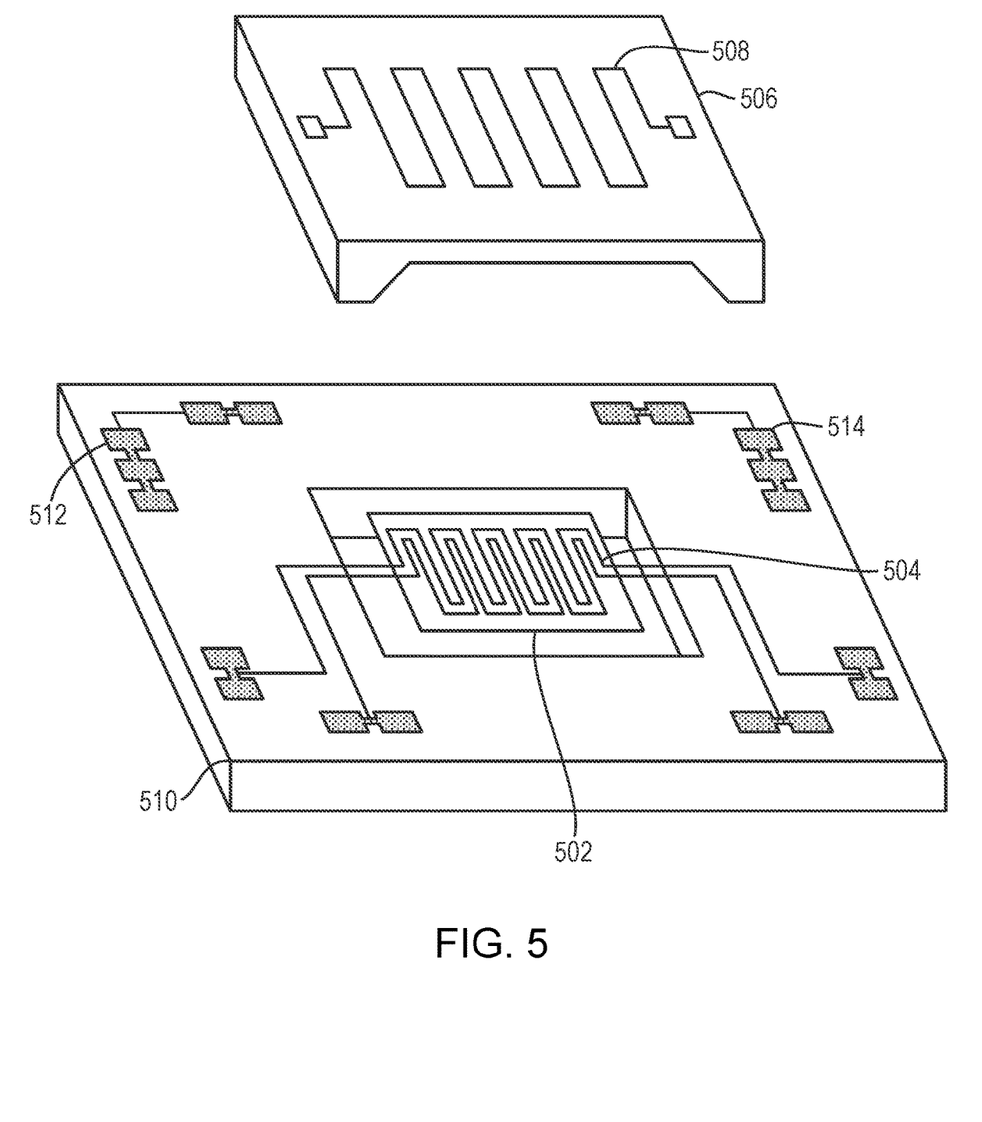
FIG. 5 is an exploded perspective illustration of a MEMS thermal conductivity sensor embodying the invention.

A MEMS sensor illustrated in FIG. 5 comprises a silicon chip 502 with a heated sensor resistive element 504 suspended in a cavity (the gauge chamber) of a silicon cover 510. A silicon cover 506 over the chip forms an opposite surface of the cavity. A heater 508 is formed on an upper or lower surface of the silicon cover 506 that forms a cavity (chamber) wall. Alternatively, the entire die could be heated using thermal conductivity to heat the cover. Temperature measurement resistors 512 are mounted on the silicon cover 510. Due to the geometry of the sensor, convection cannot take place within the cavity and consequently the sensor is insensitive to mounting position. Gas molecules are passed by diffusion only to the heated element where the heat loss of the gas is measured. The sensor element is very robust and can withstand high G-forces and instant air inrush.

Figure 6:
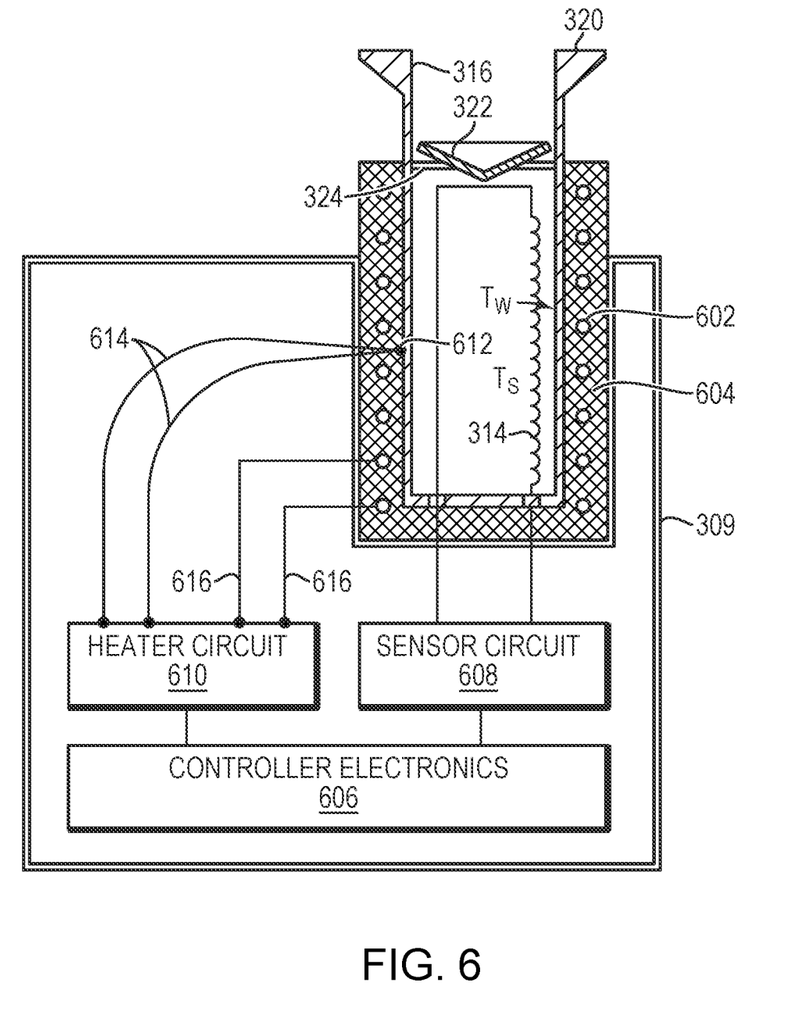
FIG. 6 is a cross-sectional view of a modification of the gauge of FIG. 3.

FIG. 6 illustrates a modification of the thermal conductivity gauge. In this embodiment, the heater is a winding 602 within the insulator 604 surrounding the chamber wall 316. Controller electronics 606, which may include a microprocessor, control heating of the sensing wire 314 to a constant temperature through a sensor circuit 608. The sensor circuit 608 may include a conventional Wheatstone bridge as shown, for example, as prior art in published PCT application WO2019/203929A1 and U.S. Pat. No. 10,845,263. However, sensor circuit 608 may be one of the novel circuits presented in that application and patent. Those novel circuits allow us to reach a targeted wire temperature and to do temperature compensation as the wall temperature changes.

A heater circuit 610 controls heating of the chamber wall 316. The closed loop circuit 610 heats the wall to a preselected, steady temperature under the control of the electronics 606. A temperature sensor 612, such as a thermistor, monitors the temperature of the chamber wall 316. The heater circuit 610 senses that temperature through leads 614 and compares the sensed temperature to a temperature set point provided by the electronics 606. The circuit 610 controls the power input to the heating coil 602 through leads 616 to maintain the temperature of the chamber wall 316 at the setpoint temperature. The temperature sensed by the sensor 612 may also be fed to the electronics 606 to be used by the electronics for temperature compensation to obtain more accurate pressure readings.

Advantages of TCG chamber wall temperature control include:

a. Accuracy improvements. Ambient temperature stabilized heat dissipation at any pressure resulting in accurate, room temperature independent pressure measurements.

b. Significantly reduced temperature coefficients. Modern TCGs cannot hold their specified accuracies over wide pressure ranges. Temperature control of the chamber wall temperature is the solution.

c. Repeatability improvements. Stable AATC assures improved repeatability of pressure measurements.

d. Self-Heating Immunity. Insensitivity to changes in power dissipation as the pressure in the system changes. TCGs self-heat at high pressures due to the higher heating power conducted to the walls. With a thermally stabilized wall for the chamber, self-heating at high pressures is eliminated and the need for compensation wires and trim resistors is eliminated.

e. No need for internal compensation wires and resistor trimming. Simpler design, reduced internal surface area and lower cost structure.

f. No need for complicated temperature compensation algorithms including non-linear effect coefficients. Algorithmic temperature compensation may still be applied in the presence of AATC, and if it is, the temperature dependence is closer to a linear behavior. Current temperature compensation algorithms rely on simplified linear temperature coefficients. Unfortunately, ignoring higher order temperature coefficients is a reason why accuracy is not good over wide temperature ranges for commercially available products. AATC of the chamber should provide accuracies matching published specifications over the entire temperature range.

g. Use of the external heater for chamber wall temperature control to dry TCG exposed to liquid mists, such as during sterilize in place (SIP) and clean in place (CIP) for lyophilization. Incomplete drying between processes is a problem particularly in wet processes. The addition of a hydrophobic coating inside the gauge can also help minimize the amount of water droplets that stick to the walls.

h. Use of the external heater for wall temperature control to generate temperature correction coefficients. Use of the heaters already present to simulate changes in atmospheric temperatures. No need for complicated temperature boxes prone to high maintenance and failures.

i. Use the elevated temperature of the walls to reduce the deposition of precursor molecules on the chamber walls. Extends the lifetime of the sensor and reduces sensor replacement cost and tool downtime for the operator.

j. Use of the elevated temperature of the chamber to clean the gauges of moisture and contaminants between process runs. Outgas/bakeout of the sensor walls is possible.

k. Use of the elevated temperature of the chamber to bakeout the chamber and eliminate outgassing at high vacuum pressures, making the sensor compatible with UHV applications without worrying about excessive outgassing.

l. Improved zero drift. The zero drift in TCGs (at the lowest end of the pressure range, or at High Vacuum) is significantly affected by wall temperature. Radiative losses dominate the heat losses from the sensor wire at high vacuum and are extremely sensitive to wall temperature variations as the radiative heat loss is proportional to $(T_s^4-T_w^4)$. Compare to gas losses being proportional to $(T_s-T_w)$. This improvement in zero drift should contribute to an improvement in accuracy and temperature range for the TCG as well. AATC of wall temperatures should improve the accuracy at the low end of the sensor and possibly extend the range of pressures over which it can be used.

m. Ability to change temperature conditions during process step switches.

n. Ability to control temperature difference $T_s-T_w$ for optimal total and partial resolution at constant pressure processes.

In terms of developing an end-point detector for lyophilization, the AATC approach brings many opportunities to improve both the sensor and the electronics performance, providing several advantages over commercially available products.

TCG Sensor Improvements for Lyophilization:
  Above Ambient Temperature control
  Improved accuracy, repeatability and stability (i.e. reduced drift)
  Active heating for drying after CIP and SIP and between processes.
  Reduced contamination due to buildup.
  Heater integrated into electronics for lower sensor replacement costs.
  Improved Drainage for liquids
  Improved drainage of water and hydrogen peroxide through mechanical design
  Proposed use of hydrophobic coatings (such as perfluorinated coating) on internal surfaces.
  Improved baffle protects the sensor wire from liquid droplets.
  Optimized Sensitivity at Process Pressures
  Sensitivity optimized for typical process pressures via (1) sensor wire design (material and dimensions), (2) wall and sensor wire temperatures, and (3) chamber design (material and dimensions).
  No requirement to cover wide pressure ranges outside the use case.
  Improved resolution
  Larger sensitivity at typical process pressures can provide higher electronics resolution for the pressure measurement TCG Electronics Improvements for Lyophilization:
  CDG Connectivity:
  CDG—Analog In: TCG has access to the CDG output via Analog Input
  CDG—Range Dial: users can dial the pressure range of CDG (0.1, 1, 10 and 100 Torr)
  CDG—Analog Out: Pass thru mode for the CDG readings
  Calibration with respect to CDG.
  Calibrate-Digital Input: signals calibration of TCG against CDG readings in the presence of purer N2.
  Zero—Digital Input: signals zeroing of CDG and TCG readings when high vacuum is present.
  Above Ambient Temperature Control Heater.
  A heater allows to control the temperature of the chamber. Heater is integral to the controller. Temperature range between 45 and 110° C.
  Heater temperature is programmable and can be changed throughout process.
  Heater can be used to dry the TCG sensor after CIP and SIP
  Temperature—Digital In: select different chamber, sensor wire temperature pairs. LEDs indicate the status of the heater (i.e. normal, dry, etc.)
  Adjustable sensor wire temperatures.
  Select different sensor wire temperatures depending on process conditions.
  TCG Total pressure output.
  TCG—Analog Out: Both linear and logarithmic analog outputs supported by the controller. 0-10V linear output matching CDG output range favored by system integrators.
  Partial Pressure Water output:
  PPH2O—Analog Out: The controller provides an analog signal that reflects the amount of water measured via comparative pressure measurement (CPM). This supports End Point Detection (EPD).
  EPD—Digital Output, Relay and LED: User can specify EPD thresholds for both Primary and secondary drying. When the threshold is crossed, the system integrators can use Digital output, relay actuation or an LED to detect the EPD. Separate levels available for Primary and secondary drying.

While example embodiments have been particularly shown and described, it will be understood by those skilled in the art that various changes in form and details may be made therein without departing from the scope of the embodiments encompassed by the appended claims.

What is claimed is:

1. A thermal conductivity pressure gauge comprising:
   a sensor resistor;
   a sensor chamber having a chamber wall spaced from the sensor resistor;
   a heater configured to heat the chamber wall; and
   electronics configured to, during a process, apply power to the sensor resistor and determine pressure of gas in the sensor chamber based on a relationship between resistance of the sensor resistor and applied power and apply power to the heater to heat the chamber wall to control temperature difference between the sensor resistor and the chamber wall, the electronics being further configured to, between process runs, elevate temperature of the chamber wall to dry the chamber wall.

2. The pressure gauge of claim 1 wherein power, during the process, is applied to the sensor resistor to maintain a constant temperature Ts and power is applied to the heater to maintain a constant chamber wall temperature Tw.

3. The pressure gauge of claim 2 wherein Ts is greater than Tw.

4. The pressure gauge of claim 2 wherein the temperature Ts is controllable to different constant temperatures.

5. The pressure gauge of claim 2 wherein the wall temperature Tw is controllable to different constant temperatures.

6. The pressure gauge of claim 1 wherein the heater is positioned within insulation surrounding the chamber wall.

7. The pressure gauge of claim 1 wherein the heater is a ribbon heater adhered to an inside surface of insulation surrounding the chamber.

8. The pressure gauge of claim 1 wherein the chamber wall and sensor resistor are removable from an assembly of the heater and the electronics and are inserted into the heater as sensor leads are plugged into the electronics to make electrical connection between the sensor resistor and the electronics.

9. The pressure gauge of claim 1 wherein, during the process, the chamber wall temperature is in the range of 45°–110° C.

10. The pressure gauge of claim 1 wherein, during the process, the sensor resistor temperature is greater than the chamber wall temperature by an amount within the range of 30°–110° C.

11. The pressure gauge of claim 1 wherein the sensor resistor is a sensor wire.

12. The pressure gauge of claim 1 wherein the sensor resistor is a resistor on a surface of a chip within a cavity and the chamber wall forms an opposite wall of the cavity.

13. The pressure gauge of claim 1 wherein the electronics are configured to heat the heater to a temperature that cleans the heater wall.

14. The pressure gauge of claim 1 further comprising a baffle across an opening in the chamber wall to a process chamber, the baffle being thermally connected to the chamber wall and configured to block contaminants and radiation from the chamber.

15. A method of thermal conductivity pressure measurement comprising:
providing a sensor resistor within a chamber having a chamber wall spaced from the sensor resistor;
heating the chamber wall to control temperature difference between the sensor resistor and the chamber wall; and
during a process, applying power to the sensor resistor and determining pressure of gas in the chamber based on the relationship between resistance of the sensor resistor and applied power, and
between process runs, elevating temperature of the chamber wall to dry the chamber wall.

16. The method of claim 15 wherein, during the process, power is applied to the sensor resistor to maintain a constant temperature Ts and power is applied to the heater to maintain a constant chamber wall temperature Tw.

17. The method of claim 16 wherein Ts is greater than Tw.

18. The method of claim 16 wherein the temperature Ts is controllable to different constant temperatures.

19. The method of claim 16 wherein the wall temperature Tw is controllable to different constant temperatures.

20. The method of claim 15 wherein the heater is positioned within insulation surrounding the chamber wall.

21. The method of claim 15 wherein the heater is a ribbon heater adhered to an inside surface of insulation surrounding the chamber.

22. The method of claim 15 wherein the chamber wall and sensor resistor are removable from an assembly of the heater and electronics and are inserted into the heater as sensor leads are plugged into the electronics to make electrical connection between the sensor resistor and the electronics.

23. The method of claim 15 wherein, during the process, the chamber wall temperature is in the range of 45°–110° C.

24. The method of claim 15 wherein, during the process, the sensor resistor temperature is greater than the chamber wall temperature by an amount within the range of 30°–110° C.

25. The method of claim 15 wherein the sensor resistor is a sensor wire.

26. The method of claim 15 wherein the sensor resistor is a resistor on a surface of a chip within a cavity and the chamber wall forms an opposite wall of the cavity.

27. The method of claim 15 wherein the electronics are configured to heat the heater to a temperature that cleans the heater wall.

28. The method of claim 15 further comprising blocking contaminants and radiation from the chamber with a baffle across an opening in the chamber wall to a process chamber, the baffle being thermally connected to the chamber wall.

29. A thermal conductivity pressure gauge comprising:
a sensor resistor;
a sensor chamber having a chamber wall spaced from the sensor resistor;
a heater configured to heat the chamber wall;
a baffle across an opening in the chamber wall, the baffle being thermally connected to the chamber wall and configured to block contaminants and radiation from the chamber; and
electronics configured to apply power to the sensor resistor and determine pressure of gas in the sensor chamber based on the relationship between resistance of the sensor resistor and applied power, and to apply power to the heater to heat the chamber wall to control temperature difference between the sensor resistor and the chamber wall.

30. The thermal conductivity pressure gauge of claim 29 wherein the baffle is conical and pointed toward the interior of the chamber.

31. A method of thermal conductivity pressure measurement comprising:
providing a sensor resistor within a chamber having a chamber wall spaced from the sensor resistor;
heating the chamber wall to control temperature difference between the sensor resistor and the chamber wall;
blocking contaminants and radiation from the chamber with a baffle across an opening in the chamber wall, the baffle being thermally connected to the chamber wall; and
applying power to the sensor resistor and determining pressure of gas in the chamber based on the relationship between resistance of the sensor resistor and applied power.

32. The method of claim 31 wherein the baffle is conical and pointed toward the interior of the chamber.

33. A thermal conductivity pressure gauge comprising:
a sensor resistor;
a sensor chamber having a chamber wall spaced from the sensor resistor;
a heater configured to heat the chamber wall; and
electronics configured to apply power to the sensor resistor and determine pressure of gas in the sensor chamber based on the relationship between resistance of the sensor resistor and applied power, and to apply power to the heater to heat the chamber wall to control temperature difference between the sensor resistor and the chamber wall;

wherein the chamber wall and sensor resistor are removable from an assembly of the heater and electronics and are inserted into the heater as sensor leads are plugged into the electronics to make electrical connection between the sensor resistor and the electronics.

34. A method of thermal conductivity pressure measurement comprising:
providing a sensor resistor within a chamber having a chamber wall spaced from the sensor resistor;
inserting the sensor resistor and chamber wall into a heater as sensor leads are plugged into electronics;
heating the chamber wall with the heater to control temperature difference between the sensor resistor and the chamber wall; and
with the electronics, applying power to the sensor resistor and determining pressure of gas in the chamber based on the relationship between resistance of the sensor resistor and applied power.

* * * * *